Sept. 30, 1958 M. BELAMIN 2,854,605
PERIODIC UNIDIRECTIONAL PULSES GENERATED BY A TRANSDUCTOR
Filed Nov. 22, 1954 2 Sheets-Sheet 1

INVENTOR.
MICHAEL BELAMIN
BY
Ostrolenk & Faber
ATTORNEYS

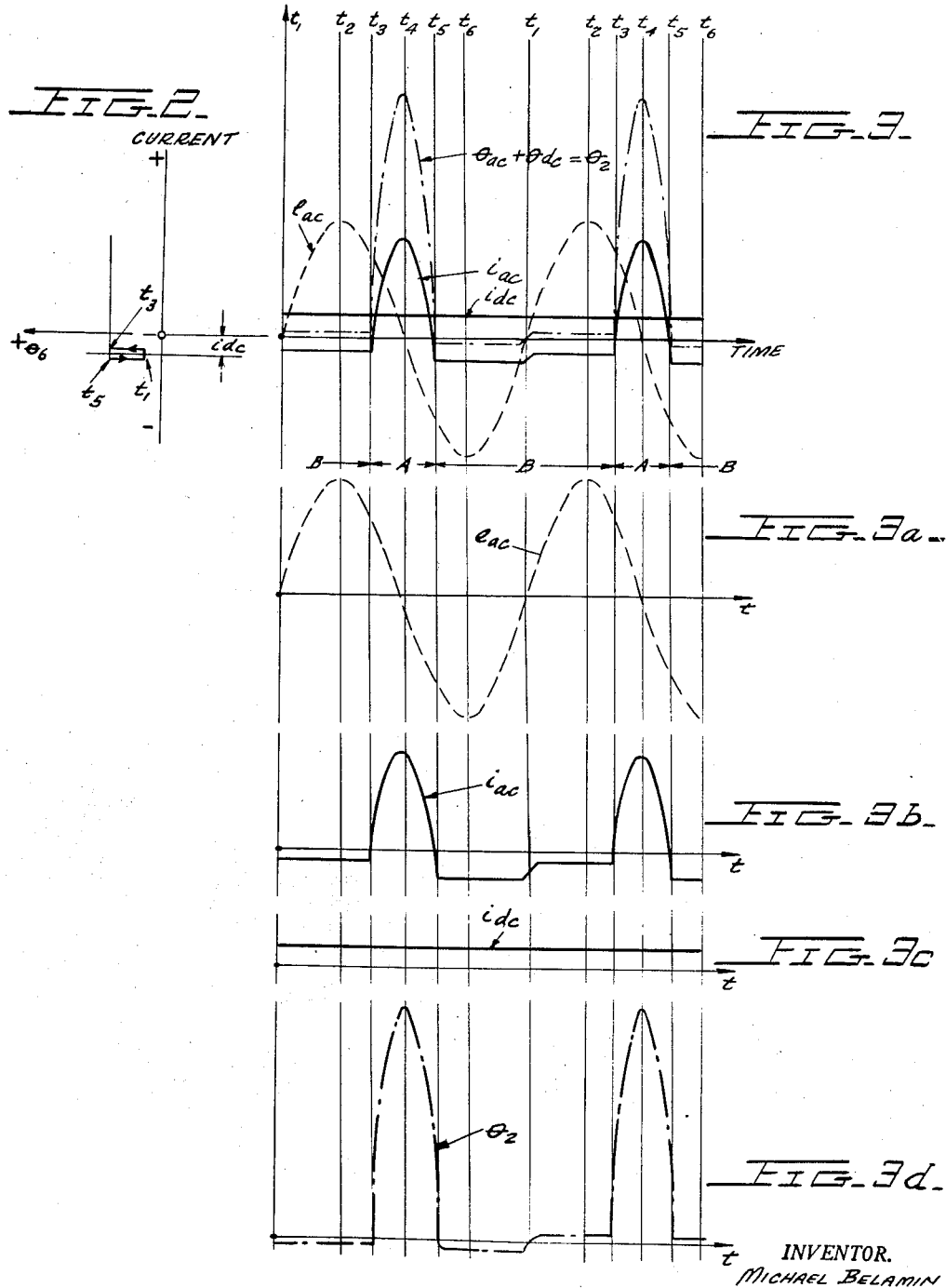

United States Patent Office 2,854,605
Patented Sept. 30, 1958

2,854,605

PERIODIC UNIDIRECTIONAL PULSES GENERATED BY A TRANSDUCTOR

Michael Belamin, Nurnberg, Germany, assignor to Siemens-Schuckertwerke A. G., Berlin and Erlangen, Germany, a corporation of Germany Application November 22, 1954, Serial No. 470,493

3 Claims. (Cl. 317—123)

My invention relates to novel circuitry to obtain periodic unidirectional pulses and is more particularly directed to a novel electrical circuit wherein a biased saturable reactor energized from an alternating current source is utilized to generate unilateral periodic pulses.

Pulses to be generated by my novel electrical circuit can be used as an operating pulse for magnetic devices especially for switching or rectifying purposes, in make pre-excitation or break pre-excitation or back-magnetization circuits for mechanical rectifiers, and in other similar applications.

In the prior art arrangement, periodic unidirectional pulse generation in switching circuits requiring a switching operation during each cycle of operation have utilized saturable transformers.

These arrangements have a primary and secondary winding wound on a common laminated saturable core with a rectifying means such as a diode or dry rectifier placed in the secondary circuit so that unidirectional pulses are produced by suppressing every other half cycle in the secondary circuit. The winding to which the unidirectional pulse magnetization is supplied is connected in series with the secondary winding. However, this arrangement is undesirable since the excitor winding represents a load for the saturable transformer during the generation of the unidirectional pulse and hence, will cause excess voltage drop and electrical losses in the circuit. Hence, this prior art arrangement requires a relatively large power input to produce a given periodic unidirectional pulse.

With my novel circuit, I eliminate the saturable transformer component and utilize a single saturable reactor which, although connected in series with the excitor winding, can produce a given periodic unidirectional pulse with a relatively small power input as compared with the prior art arrangement.

In my novel circuit, the saturable reactor is provided with an A.-C. winding and a D.-C. biasing winding. The D.-C. bias unbalances the saturable reactor so that pulses in one direction can predominate over those in the other direction or the pulses will occur in only one direction and will be suppressed in the reverse direction due to the unsaturated condition of the biased saturable reactor during this interval of time.

In my novel arrangement, I provide control means in the D.-C. bias circuit so that the magnitude of current flowing in the biasing winding can be controlled. By altering the magnitude of the D.-C. bias, the magnitude of the generated periodic unidirectional pulse can be controlled. During a portion of the conducting cycle, the resultant M. M. F. generated by both cooperating windings, i. e. the alternating current winding and the biasing winding, is insufficient to saturate the biased saturable reactor. Thus, during the period of the time the biased saturable reactor will have a very large impedance as compared with its series connected excitor winding and hence, the entire voltage of the A.-C. source will exist across the saturable reactor A.-C. winding. However, when the M. M. F. generated in the biased saturable reactor by the D.-C. winding and the A.-C. winding are added together to thereby saturate the core of the saturable reactor, the A.-C. winding will have negligible impedance and hence, a pulse will be generated.

Since it is ultimately desired to provide make or break pre-excitation or back-magnetization for the magnetic circuit energized by the excitor winding, means must be provided to compensate or neutralize for the effect of the current flow in the A.-C. circuit during the unsaturated period of time. That is, since it is ultimately desired to have only a periodic unidirectional pulse energize the magnetic circuit associated with the excitor winding additional means must be provided to block or neutralize the energization of the magnetic circuit by the excitor winding during this unsaturated period of the biased saturable reactor.

I achieve this result by providing a neutralizing winding for the magnetic circuit energized by the excitor winding. The neutralizing winding may be connected in series with the D.-C. bias winding of the saturable reactor and hence, the magnitude of current flowing through this winding is the same as that flowing through the biasing winding.

By providing a proper turns ratio, I can create an M. M. F. from the D.-C. circuit which will neutralize the M. M. F. from the A.-C. circuit during the unsaturated period of the biased saturable reactor.

Accordingly, a primary object of my invention is to provide a novel circuit in which a biased saturable reactor energized from the alternating current source is utilized to generate periodic unidirectional pulses.

Still another object of my invention is to provide a saturable reactor having a D.-C. bias winding which can control the maximum value of periodic unidirectional pulses.

A still further object of my invention is to provide a novel circuit having the basic components of a biased saturable reactor and a magnetic circuit wherein a D.-C. circuit biases the reactor to provide generation of periodic unidirectional pulses and also neutralize the M. M. F. in the magnetic circuit during the period of time when no pulse is generated.

Still another object of my invention is to provide a novel circuit arrangement in which a saturable reactor is utilized as a generator of unidirectional pulses.

These and other objects of my invention will be apparent from the following description when taken in connection with the drawings in which:

Figure 1 is a circuit diagram of my invention and illustrates the use of a biased saturable reactor as a generator for a periodic unidirectional pulse which is to be fed to the excitor winding of the magnetic device. This figure also illustrates the D.-C. circuit which serves the dual function of biasing a reactor and neutralizing the M. M. F. in the magnetic device.

Figure 2 is a hysteresis loop illustrating the magnetic conditions existing in the biased saturable reactor.

Figure 3 is a composite voltage, current, flux curve illustrating the conditions existing in the circuit at various times.

Figure 3a is a voltage-time curve illustrating an A.-C. voltage which is also shown in Figure 3.

Figure 3b is a current-time curve illustrating the alternating current of Figure 3.

Figure 3c is a current-time curve illustrating the D.-C. current of Figure 3.

Figure 3d is a flux-time curve showing the magnitude of flux in the magnetic device and is a duplicate of the flux curve of Figure 3.

Figure 1:
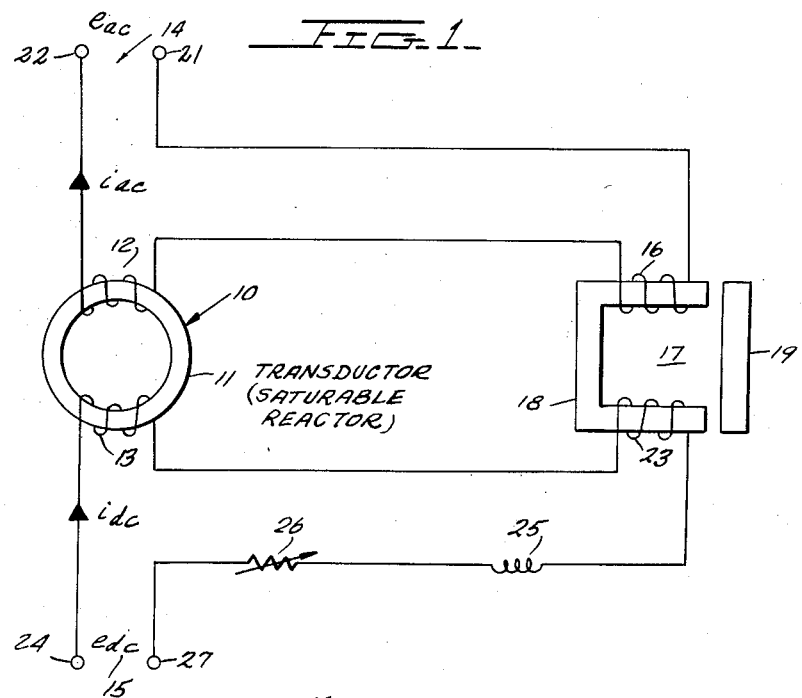

Referring now to Figure 1, the saturable reactor 10 has a magnetic core 11, the characterization of which are illustrated in the hysteresis loop of Figure 2. The core 11 of the saturable reactor 10 is provided with an alternating current winding 12 and a direct current biasing winding 13. The A.-C. winding 12 is energized from the A.-C. source 14 which may be the secondary of a single or three phase transformer. The source voltage 14 is designated as $e_{a-c}$.

The A.-C. circuit is comprised of the A.-C. winding 12 connected in series with the exciter winding 16 wound on the magnetic device 17 which has the magnetic core 18 and an armature 19.

The complete A.-C. circuit is as follows: From the A.-C. terminal 21, exciter winding 16, A.-C. winding 12, to the other A.-C. terminal 22.

The D.-C. biasing 13 is energized from the D.-C. source 15 and the voltage is designated as $e_{d-c}$.

The magnetic device 17 is provided with a neutralizing winding 23 which is wound on the magnetic core 18 and is connected in series with the D.-C. biasing winding 13.

The D.-C. circuit extends from the D.-C. terminal 24 through the D.-C. biasing winding 13 to the neutralizing winding 23, smoothing choke 25, variable resistance 26, to the positive terminal of the D.-C. source 27.

The circuit arrangement of Figure 1 is so designed that a periodic unidirectional pulse will be supplied to the exciter winding 16 during the saturated period of the biased saturable reactor 10. During the unsaturated period of the biased saturable reactor 10, the net M. M. F. in the magnetic device 17 will be zero.

The turns ratio of the A.-C. winding 12, the D.-C. biasing winding 13, the exciter winding 16 and the neutralizing winding 23 have the following relationship $N_{12}/N_{13}=N_{16}/N_{23}$.

The circuit operates in the following manner at the time $t_1$, as seen in Figures 3 and 3a. The A.-C. voltage $e_{a-c}$ is at zero value and increasing in a positive direction. Since the A.-C. circuit is predominantly inductive, the current flow $i_{a-c}$ therein will lag the voltage $e_{a-c}$.

At the time $t_1$, the M. M. F. generated by the D.-C. biasing winding 13 will oppose the M. M. F. generated by the A.-C. winding 12 in the saturable reactor 10. The core 11 of the reactor 10 will be unsaturated at this time $t_1$, as illustrated in Figure 2. Hence, the A.-C. winding 12 will have a relatively large impedance and the entire A.-C. voltage $e_{a-c}$ will exist across winding 12 and the current flowing in the A.-C. circuit will be stepped to a minimum value. This condition will exist through time $t_3$.

At time $t_3$, the core 11 of the saturable reactor 10 will become saturated and hence, the impedance of the A.-C. winding 12 will drop to a negligible value. At this time, all of the A.-C. voltage $e_{a-c}$ will exist across the exciting winding 16, which has a relatively low impedance, and hence, a pulse will be generated.

During the period of time $t_3$ to $t_4$, the A.-C. voltage $e_{a-c}$ is decreasing towards zero and the core 11 of the saturable reactor 10 will remain saturated.

During this period of time from $t_3$ to $t_4$ when the reactor core 11 is saturated, the magnitude of A.-C. current flowing through the A.-C. circuit will be limited only by the impedance value of the exciter winding 16.

At time $t_4$, the A.-C. voltage $e_{a-c}$ will pass through zero and hence, the pulse will reach its maximum value at this time. One half of the pulse will be generated during this period of time.

During the period of time from $t_4$ to $t_5$, the magnetic core 11 of the reactor remains saturated but the magnitude of current will decrease. However, immediately following the time $t_5$, the core 11 of the reactor will become unsaturated as seen in the hysteresis curve of Figure 2, and hence the main A.-C. winding 12 will now have a high impedance and all of voltage $e_{a-c}$ will exist across the winding 12. Thus, the current will again be stepped due to the large magnitude of the impedance of winding 12.

During the period of time that the voltage $e_{a-c}$ is in the negative half portion of its cycle, the saturable reactor 11 will remain unsaturated and hence, the current will continue to be stepped, as seen in Figures 3 and 3b.

At time $t_1$ when the A.-C. voltage $e_{a-c}$ is decreasing from its negative value and increasing towards its positive value, the core 11 will continue to remain unsaturated during this period of time and will continue to be unsaturated until the time $t_3$ and the cycle repeats itself in a manner heretofore described.

Hence, during the interval B, as indicated in Figure 3, the saturable reactor core 11 will be unsaturated and during the interval A, the reactor core 11 will be saturated. During the period B, the current $i_{a-c}$ will be stepped and maintained at a minimum value whereas this current will be responsible for the pulse during the saturated period A.

Considering that there is no unidirectional conductive element in the pulse current circuit including the windings 12 and 16, the extent of the area below the positive portion of the A.-C. current curve during the interval A has always to be equal to the extent of the area between the negative portion of the A.-C. current curve and the zero line during the period B.

Because the difference of the ampere windings of the alternating current winding 12 and the direct current winding 13 represents the M. M. F. required for the magnetization of the magnet core 11 in the unsaturated condition and because these magnetization ampere turns are negligibly small relative to those of the alternating current winding 12 and the direct current winding 13, the ampere-turns of the A.-C. winding 12 must necessarily be substantially equal to the ampere turns of the biasing winding 13 during the interval B.

As heretofore noted, a small magnitude of A.-C. current will flow through the A.-C. circuit during the interval B. Since this current is flowing through the series exciter winding 16, the magnetic circuit 18 will be energized, in an opposite direction than during the period A when the pulse is flowing. Although the magnitude of energization is very small, means are provided to counteract this undesirable condition during the unsaturated period B by providing a neutralizing winding 23 which is series connected in the D.-C. circuit.

The circuitry is so designed that the ampere-turns of the exciter winding 16 are opposite to the ampere-turns of the neutralizing winding 23 during the period of time B and preferably, may be equal thereto. Hence, during this unsaturated period, the net M. M. F. in the magnetic circuit 18 will be very small or substantially zero. However, during the saturated period A, the M. M. F. from the neutralizing winding 23 will aid the M. M. F. of the exciter winding 16, as seen in Figures 3 and 3d.

As heretofore noted, the magnitude of the A.-C. pulse can be adjusted by changing the magnitude of the D.-C. current $i_{d-c}$. As the magnitude of D.-C. current $i_{d-c}$ is decreased, the magnitude of pulse current will decrease. In like manner, when the variable resistor 26 is adjusted to increase the magnitude of D.-C. current $i_{d-c}$, the magnitude of pulse current will increase.

It will also be noted that the magnitude of pulse current as well as the time A can be adjusted by changing the magnitude of A.-C. voltage source $e_{a-c}$. However, it will be apparent to those skilled in the art that it would be more practical to control the magnitude of pulse current by the variable resistor 26 in the D.-C. circuit rather than adjusting the magnitude of A.-C. voltage $e_{a-c}$.

Figure 4:
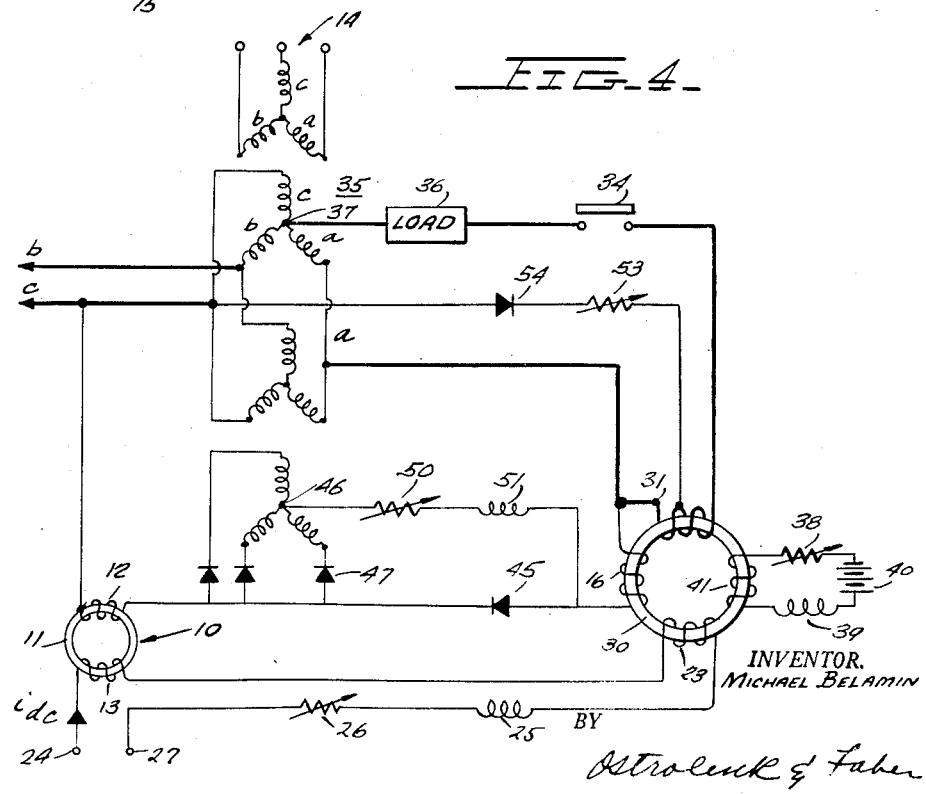
Figure 4 is a circuit diagram showing one application of my novel pulse circuit to a mechanical rectifier.

In Figure 4, I have shown the novel biased saturating reactor circuit of Figure 1 applied to a mechanical or an electromagnetic rectifier to show the manner and means whereby this circuitry can be utilized as a back magnetization device in order to shorten the make step of the current and thereby increase the output D.-C. voltage of the rectifier.

In Figure 4, I have replaced the magnetic device 18 by the commutating reactor 30 which has a main winding 31 connected in series with the main rectifying circuit. For the sake of simplicity, I have shown the circuit connections for only phase $a$ of the source although it will be apparent to those skilled in the art that the circuitry for phases $b$ and $c$ will be identical to that set forth in Figure 4.

To facilitate comparison of the heretofore described circuit of Figure 1 with the application of Figure 4, I have labelled similar parts with the same numerals.

In the arrangement of Figure 4, the pulse generated by the biased saturable reactor 10 during the period A will occur when the main mechanical driven or magnetically operated contacts 34 are open in order to achieve back magnetization of the commutating reactor 30.

The basic components of the circuit of Figure 4 are as follows. The three phase transformer 35 is used to couple an A.-C. source 14 to the rectifier circuit. The transformer 35 has phases $a$, $b$ and $c$ although only phase $a$ is shown connected to this circuit.

The load 36 is connected to the center tap 37 of the star connected secondary of the transformer 35 and is also connected to the one terminal of the contacts 34.

The other terminal of the contacts 34 is connected to one terminal of the main commutating reactor winding 31. The other terminal of main commutating reactor winding 31 is connected to phase $a$ of the transformer 35. Thus, when contacts 34 are closed, a current will flow through the load 36.

The commutating reactor 30 is provided with an excitor winding 16 which receives a pulse from the biased saturable reactor 10 in a manner heretofore described in connection with Figure 1. Also, as heretofore illustrated and described, the commutating reactor 30 is provided with a neutralizing winding 23 which operates and functions in the same manner as described in connection with neutralizing winding 23 for the magnetic device 18 of Figure 1.

The commutating reactor 30 may also be provided with a D.-C. biased circuit which is comprised of the variable resistor 38 and the smoothing choke 39 which are connected in series to a direct current source 40. Thus, the magnitude of current in the D.-C. biasing winding 41 can be controlled by adjusting the variable resistor 38.

As is well known in the mechanical and electromagnetic art, the main contacts 34 will be mechanically or magnetically driven closed during the positive half cycle of the commutating voltage supplied by the transformer 35 and the current will be stepped during the make operation.

At the end of the current flowing period the contacts 34 will be separated during the period of time that the current from the transformer 35 is stepped as a result of the commutating reactor 30.

During the period of time that the contacts 34 remain open, it is desirable to provide a pulse for the commutating reactor in order to achieve back-magnetization so that the following make step will be of shortened duration to thereby substantially increase the D.-C. output voltage of the rectifier. Thus, it is necessary to have the pulse generated by the biased saturable reactor occur during the period of time that the contacts 34 are disengaged. However, this pulse must not disrupt the step of the current flowing through the main rectifying circuit during the opening operation of the contacts 34 or during the making operation thereof. Hence it is desirable to have the pulse generated within a relatively short period of time.

However, this magnitude of current may be too large for the components and circuitry involved and hence, it would be desirable to insure that the magnitude of the pulse will not exceed a predetermined value.

That is the saturable reactor 10, when saturated during the interval A has practically zero impedance and hence there is no current limiting impedance. In the embodiment of Figure 1, the magnetic circuit 18 never becomes saturated and hence represents a linear inductance to limit the magnitude of the pulse current and hence no additional current limiting means are required. However, when the pulse is fed to the commutating reactor 30 current limiting means are required.

Although the magnitude of the pulse current can be limited by inserting a resistor, this method is highly undesirable as it will introduce additional IR losses in the circuit. Hence, it is desirable to provide current limiting means to keep the current pulse magnitude at a predetermined value. I accomplish this by providing a rectifier 45 in series with the A. C. circuit of the biased saturable reactor 10. The rectifier 45 may be of the dry type or a diode. The rectifier 45 is poled in the opposite direction of the pulse generated by my novel circuit. That is, the rectifier 45 would normally tend to resist the flow of this pulse current. However, in addition to the rectifier 45, I provide a D. C. biasing circuit which pulls this rectifier in its positive direction. This is achieved by providing a second small transformer 46 which may be fed from the main transformer 35. Each phase of the small auxiliary transformer 46 is provided with a rectifier 47 which may be of the dry type. Thus, the transformer 46 with its rectifier 47 represent a D. C. source 46—47 can be controlled by the variable resistor 50 to determine the degree of D. C. bias for the rectifier 45.

During the unsaturated interval B, the current in the A. C. circuit is flowing through the rectifier 45 in its low impedance direction. However, during the saturated period A when the pulse is generated, the pulse current cannot flow through the rectifier 45 in its high impedance direction. However, since the rectifier has been provided with a D. C. bias circuit 46, 51, the pulse current will be superimposed to the D. C. bias until it completely counteracts the effects thereof and the resultant current through the dry rectifier is zero. Then, further increasing of pulse current is impossible.

By adjusting the variable resistor 50, the magnitude of pulse current which will flow through the rectifier 45 can be adjusted. Hence, this combination of components will serve as a current limiting circuit.

As heretofore noted in connection with Figure 1, the magnitude of the pulse current can either be controlled by the variable resistor 26 located in the D. C. circuit or by altering the magnitude of the A. C. voltage.

In the arrangement of Figure 4, I have shown a series combination of a variable resistor 53 and the rectifier 54 connected to the center tap of the main winding 31 of the commutating reactor 30 and also connected to one phase of the secondary of transformer 35.

This circuit together with the direct current circuit 38 to 41 furnishes the opening bias magnetization. Both circuits have been mentioned simply for completeness. Both circuits have nothing to do with the invention proper, namely, the production of an impulse (for reverse biasing).

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. Circuit means for generating periodic unidirectional pulses comprising a saturable reactor and an inductor; said saturable reactor having an A. C. winding connected in series with an A. C. source and an excitor winding of said inductor; said saturable reactor having a biasing winding; said inductor having a neutralizing winding; said biasing winding and said neutralizing winding being connected to a D. C. source; the ampere turns of said A. C. winding of said saturable reactor being greater than the D. C. ampere turns of said biasing winding of said saturable reactor; said neutralizing winding generating a magneto-motive force in a direction opposite to the magneto-motive force generated by said excitor winding when a pulse is conducted through said excitor winding.

2. A periodic unidirectional pulse generating circuit for a rectifier comprised of a saturable reactor and an inductor; said saturable reactor having an A. C. winding and a D. C. biasing winding; said inductor having an excitor winding and a neutralizing winding; said biasing winding of said saturable reactor and said neutralizing winding of said inductor connected in series and energized from a D. C. source; said A. C. winding of said saturable reactor and said excitor winding of said inductor connected in series and energized from a D. C. source; a variable resistor connected in series with said biasing winding and said neutralizing winding, the ampere turns of said A. C. winding of said commutating reactor being greater than the D. C. ampere turns of the biasing winding of said commutating reactor, an adjustable resistor connected in series with said biasing winding and said neutralizing winding.

3. A periodic unidirectional pulse generating system; said pulse generating system comprising a saturable reactor and an inductor; said saturable reactor being comprised of a core of relatively high permeability material having an A. C. winding and D. C. winding wound thereon; said inductor comprising a core of relatively low permeable material and having an excitor winding and a neutralizing winding wound thereon; an A. C. circuit and a D. C. circuit; said A. C. circuit including the series connection of an A. C. source, said A. C. winding, and a pulse receiving load including said excitor winding; said D. C. circuit comprising the series connection of a D. C. source, said D. C. winding and said neutralizing winding; said D. C. winding controlling the point of saturation of said core of said saturable reactor when the voltage of said A. C. source is of a predetermined polarity; said neutralizing winding being wound in a direction to prevent D. C. saturation of said inductor core by unidirectional pulses applied to said excitor winding.

References Cited in the file of this patent

UNITED STATES PATENTS

| | | |
|---|---|---|
| 2,142,837 | Edwards | Jan. 3, 1939 |
| 2,199,121 | Walsh | Apr. 30, 1940 |
| 2,230,571 | Koppelmann | Feb. 4, 1941 |
| 2,283,697 | Prince | May 19, 1942 |
| 2,329,021 | Walsh | Sept. 7, 1943 |
| 2,351,975 | Koppelmann | June 20, 1944 |
| 2,664,525 | Diebold | Dec. 29, 1953 |
| 2,759,124 | Willis | Aug. 14, 1956 |